US011295459B2

(12) United States Patent
Yamaura et al.

(10) Patent No.: US 11,295,459 B2
(45) Date of Patent: Apr. 5, 2022

(54) INFORMATION PROCESSING APPARATUS

(71) Applicant: FUJIFILM Business Innovation Corp., Tokyo (JP)

(72) Inventors: Yusuke Yamaura, Kanagawa (JP);
Yukihiro Tsuboshita, Kanagawa (JP);
Masatsugu Tonoike, Kanagawa (JP);
Ryoko Usuba, Kanagawa (JP); Takeshi Onishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 188 days.

(21) Appl. No.: 15/979,487

(22) Filed: May 15, 2018

(65) Prior Publication Data

US 2019/0180455 A1 Jun. 13, 2019

(30) Foreign Application Priority Data

Dec. 12, 2017 (JP) .............................. JP2017-237613

(51) Int. Cl.
 *G06T 7/292* (2017.01)
 *G06T 7/277* (2017.01)

(52) U.S. Cl.
 CPC .............. *G06T 7/292* (2017.01); *G06T 7/277* (2017.01); *G06T 2207/10016* (2013.01); *G06T 2207/20076* (2013.01); *G06T 2207/30196* (2013.01); *G06T 2207/30201* (2013.01)

(58) Field of Classification Search
 CPC ...................... G06T 7/277; G06T 7/292; G06T 2207/10016; G06T 2207/20076; G06T 2207/30196; G06T 2207/30201
 See application file for complete search history.

(56) References Cited

U.S. PATENT DOCUMENTS

| | | | |
|---|---|---|---|
| 7,457,439 B1 * | 11/2008 | Madsen | G06T 7/246 348/154 |
| 10,311,617 B2 * | 6/2019 | Inoue | G09B 19/00 |
| 2013/0260351 A1 * | 10/2013 | Pasqualis | G09B 5/00 434/322 |

(Continued)

FOREIGN PATENT DOCUMENTS

| | | | |
|---|---|---|---|
| JP | 2003271048 | | 9/2003 |
| JP | 2005198818 A | * | 7/2005 |

(Continued)

OTHER PUBLICATIONS

Office Action of Japan Counterpart Application, with English translation thereof, dated Jul. 13, 2021, pp. 1-9.

(Continued)

*Primary Examiner* — Mekonen T Bekele
(74) *Attorney, Agent, or Firm* — JCIPRNET

(57) ABSTRACT

An information processing apparatus includes an acquisition section that acquires at least two first evaluation values obtained by evaluating a motion of a worker in time series and a reference evaluation value obtained by evaluating a motion of an expert as an exemplar of the worker, a calculation section that calculates at least two motion levels indicating similarity between the at least two first evaluation values and the reference evaluation value, and an output section that outputs a development degree indicating a degree of development of the worker based on the at least two motion levels.

17 Claims, 8 Drawing Sheets

(56) References Cited

U.S. PATENT DOCUMENTS

| | | | |
|---|---|---|---|
| 2015/0269860 A1 | 9/2015 | Shaw et al. | |
| 2017/0039088 A1* | 2/2017 | Sumioka | G06Q 10/06311 |
| 2018/0165622 A1* | 6/2018 | Okabe | G06Q 10/063114 |
| 2018/0253597 A1* | 9/2018 | Kozakaya | G08B 13/196 |
| 2019/0089930 A1* | 3/2019 | Hashimoto | G06T 19/20 |
| 2019/0114571 A1* | 4/2019 | Nichols | G06Q 10/06311 |
| 2019/0370982 A1* | 12/2019 | Sasaki | G06T 7/248 |
| 2020/0074380 A1* | 3/2020 | Mori | G06K 9/00369 |

FOREIGN PATENT DOCUMENTS

| | | | |
|---|---|---|---|
| JP | 2006190166 | | 7/2006 |
| JP | 2008201569 | | 9/2008 |
| JP | 2009086542 | | 4/2009 |
| JP | 2011152333 A | * | 8/2011 |
| JP | 2012023446 | | 2/2012 |
| JP | 2012078768 | | 4/2012 |
| JP | 2012234406 | | 11/2012 |
| JP | 2012234406 A | * | 11/2012 |
| JP | 2016062084 | | 4/2016 |

OTHER PUBLICATIONS

"Office Action of Japan Counterpart Application", dated Jan. 11, 2022, with English translation thereof, p. 1-p. 6.

* cited by examiner

| WORK TARGET | DEVELOPMENT DEGREE | MOTION TYPE 1 | | | MOTION TYPE 2 | | | MOTION TYPE 3 | | | ... | ... | MOTION TYPE N |
|---|---|---|---|---|---|---|---|---|---|---|---|---|---|
| | | DEVELOPMENT DEGREE | | | DEVELOPMENT DEGREE | | | DEVELOPMENT DEGREE | | | | | |
| | | LOW | MIDDLE | HIGH | LOW | MIDDLE | HIGH | LOW | MIDDLE | HIGH | | | |
| | LOW | $\alpha_{11}$ | $\alpha_{12}$ | $\alpha_{13}$ | $\beta_{11}$ | $\beta_{12}$ | $\beta_{13}$ | $\gamma_{11}$ | $\gamma_{12}$ | $\gamma_{13}$ | ... | ... | ... |
| | MIDDLE | $\alpha_{21}$ | $\alpha_{22}$ | $\alpha_{23}$ | $\beta_{21}$ | $\beta_{22}$ | $\beta_{23}$ | $\gamma_{21}$ | $\gamma_{22}$ | $\gamma_{23}$ | ... | ... | ... |
| | HIGH | $\alpha_{31}$ | $\alpha_{32}$ | $\alpha_{33}$ | $\beta_{31}$ | $\beta_{32}$ | $\beta_{33}$ | $\gamma_{31}$ | $\gamma_{32}$ | $\gamma_{33}$ | ... | ... | ... |

WORKER

INFORMATION PROCESSING APPARATUS

CROSS-REFERENCE TO RELATED APPLICATIONS

This application is based on and claims priority under 35 USC 119 from Japanese Patent Application No. 2017-237613 filed Dec. 12, 2017.

BACKGROUND

Technical Field

The present invention relates to an information processing apparatus.

SUMMARY

According to an aspect of the invention, there is provided an information processing apparatus which includes an acquisition section that acquires at least two first evaluation values obtained by evaluating a motion of a worker in time series and a reference evaluation value obtained by evaluating a motion of an expert as an exemplar of the worker, a calculation section that calculates at least two motion levels indicating similarity between the at least two first evaluation value and the reference evaluation value, and an output section that outputs a development degree indicating a degree of development of the worker based on the at least two motion levels.

BRIEF DESCRIPTION OF THE DRAWINGS

Exemplary embodiment(s) of the present invention will be described in detail based on the following figures, wherein:

FIG. 3 is a diagram illustrating an example of a weighting coefficient table;

DETAILED DESCRIPTION

Figure 1:
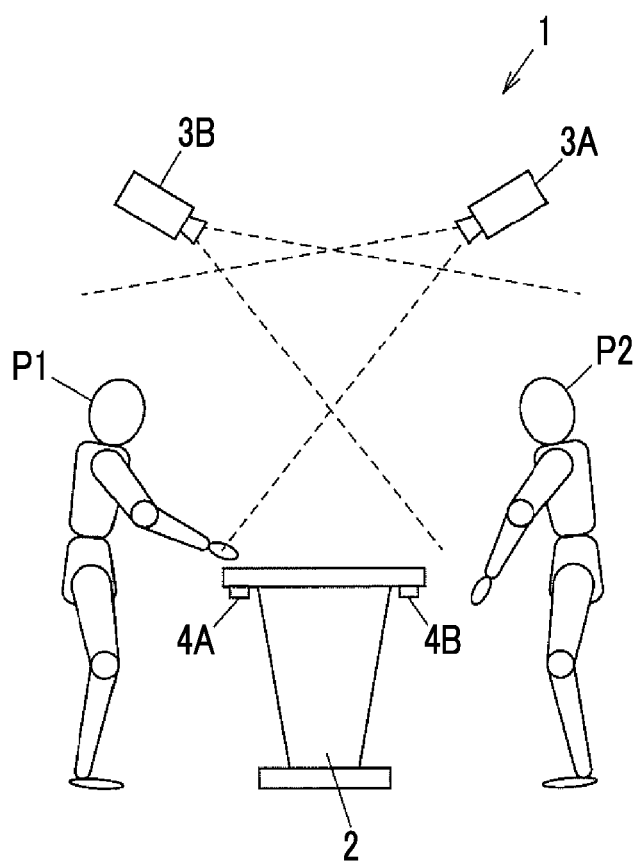
FIG. 1 is a diagram illustrating an example of a configuration of an evaluation system according to a first exemplary embodiment of the present invention.

Hereinafter, exemplary embodiments of the present invention will be described with reference to the drawings. In the drawings, components having substantially the same function are denoted by the same reference signs and descriptions thereof will not be repeated.

Summary of Exemplary Embodiments

An information processing apparatus according to an exemplary embodiment of the present invention includes an acquisition section that acquires at least two first evaluation values obtained by evaluating a motion of a worker in time series and a reference evaluation value obtained by evaluating a motion of an expert who is an exemplar of the worker, a calculation section that calculates at least two motion levels indicating similarity between the at least two first evaluation value and the reference evaluation value, and an output section that outputs a development degree indicating a degree of development of the worker based on the at least two motion levels.

"A work counterpart" means a person or an object as a target of a work of a worker. The development degree may be a difference between two motion levels or be a rate of change (also referred to as a development rate) of the motion level, which is obtained by dividing this difference by the elapsed time.

First Exemplary Embodiment

FIG. 1 is a diagram illustrating an example of a configuration of an evaluation system according to a first exemplary embodiment of the present invention. The evaluation system 1 includes, for example, a first camera 3A, a second camera 3B, a first microphone 4A, and a second microphone 4B. The first camera 3A performs imaging of a worker P1 who works. The second camera 3B performs imaging of a work counterpart P2 as a target of the work of the worker P1. The first camera 3A and the second camera 3B are provided in a work area. The first microphone 4A is provided on a counter 2 and receives an input of voice of the worker P1. The second microphone 4B is provided on the counter 2 and receives an input of voice of the work counterpart P2. The work counterpart P2 is a person in the exemplary embodiment.

The work area in the exemplary embodiment corresponds to, for example, a retail store such as a convenience store, a reception area such as a reception of a hotel, and the like.

The first microphone 4A and the second microphone 4B (also referred to as "a microphone 4" when being collectively referred to) may not be provided on the counter 2 and may be provided on a wall or other places. For example, the first microphone 4A may be provided in the first camera 3A and the second microphone 4B may be provided in the second camera 3B. The first camera 3A and the second camera 3B are also referred to as "a camera 3" below when being collectively referred to.

The position and the speed of each portion of a person, the orientation of the face, the facial expression (smile and the like), the posture thereof and the like may be detected by the camera 3. The utterance quantity, the conversation volume, the tone of voice, laughter, and the like may be detected by the microphone 4. Information detected by the camera 3 and the microphone 4 is an example of motion information. The camera 3 and the microphone 4 may be a wearable terminal integrated with a sensor that acquires motion information. The sensor may detect grip strength, torque, the number of rotations of the wrist, the line of sight, acceleration, angular acceleration, the speed of movement, the amount of change, and the like. The motion information may be biometric information such as the tone of voice, the heart rate, the respiration rate, concentration, the amount of stress, the degree of fatigue, the state of autonomic nerves and the like, in addition to the information regarding the conversation volume or the number of times of smiling. The motion information may be different in accordance with the type (sales employee, factory worker, and the like) of the worker P1.

Figure 2:
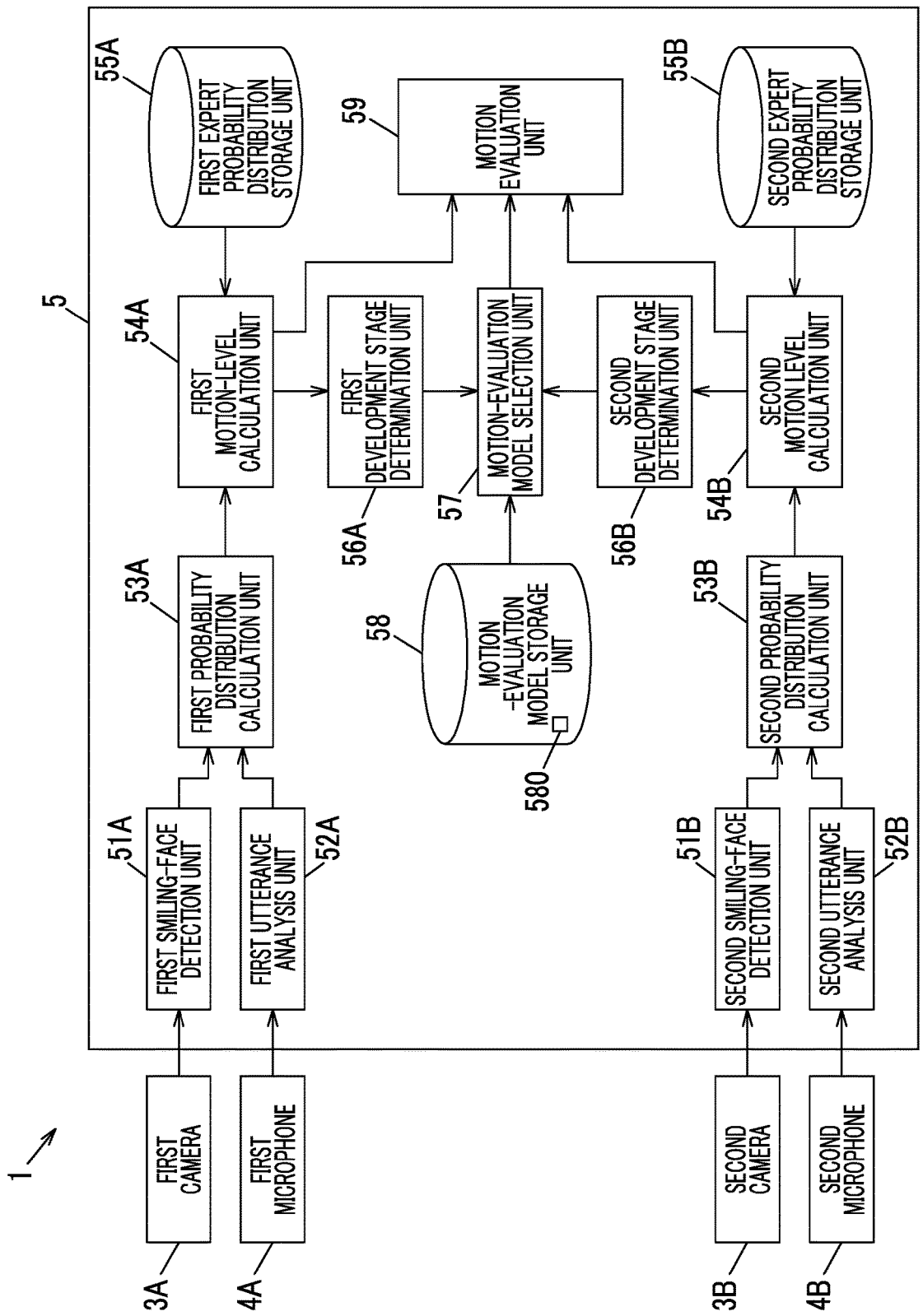
FIG. 2 is a block diagram illustrating an example of a control system in the evaluation system according to the first exemplary embodiment.

FIG. 2 is a block diagram illustrating an example of a control system in the evaluation system 1. The evaluation system 1 includes an evaluation device 5 connected to the first camera 3A, the second camera 3B, the first microphone 4A, and the second microphone 4B. The evaluation device 5 is an example of an information processing apparatus.

The evaluation device 5 is realized by a computer device, for example. The evaluation device 5 may be realized by one computer device or may be realized by plural computer devices which are connected to each other through a network.

In the evaluation device 5, a first smiling-face detection unit 51A, a first utterance analysis unit 52A, a first probability distribution calculation unit 53A, a first motion level calculation unit 54A, a first expert probability distribution storage unit 55A, and a first development stage determination unit 56A are provided for the worker P1. The first camera 3A is connected to the first smiling-face detection unit 51A. The first microphone 4A is connected to the first utterance analysis unit 52A. Each of the first smiling-face detection unit 51A, the first utterance analysis unit 52A, and the first motion level calculation unit 54A is an example of an acquisition section. The first probability distribution calculation unit 53A and the first motion level calculation unit 54A are an example of a calculation section that calculates the motion level of a worker P1. The first development stage determination unit 56A is an example of an output section.

In the evaluation device 5, a second smiling-face detection unit 51B, a second utterance analysis unit 52B, a second probability distribution calculation unit 53B, a second motion level calculation unit 54B, a second expert probability distribution storage unit 55B, and a second development stage determination unit 56B are provided for the work counterpart P2. The second camera 3B is connected to the second smiling-face detection unit 51B. The second microphone 4B is connected to the second utterance analysis unit 52B. Each of the second smiling-face detection unit 51B, the second utterance analysis unit 52B, and the second motion level calculation unit 54B is an example of the acquisition section. The second probability distribution calculation unit 53B and the second motion level calculation unit 54B are an example of a calculation section that calculates the motion level of a work counterpart P2. The second development stage determination unit 56B is an example of the output section.

In addition, in the evaluation device 5, a motion-evaluation model selection unit 57, a motion-evaluation model storage unit 58, and a motion evaluation unit 59 are provided in common to the worker P1 and the work counterpart P2.

For example, the first smiling-face detection unit 51A and the second smiling-face detection unit 51B (also referred to as "a smiling-face detection unit 51" below when being collectively referred to) detect a smiling face by detecting an area of the face from an image imaged by the camera 3, and performing pattern matching of the detected area of the face. The smiling-face detection unit 51 detects the number of times of the worker P1 or the work counterpart P2 smiling per day, based on images obtained by imaging of the camera 3. The number of times of smiling is an example of the motion type. "The motion type" refers to the type of a motion performed by the worker.

The first utterance analysis unit 52A and the second utterance analysis unit 52B (also referred to as "an utterance analysis unit 52" when being collectively referred to) performs voice recognition processing on voice input from the microphone 4, converts the voice into a character string, and detects the utterance quantity. The utterance analysis units may detect the number of times of uttering, the utterance time, and the utterance speed. The utterance quantity refers to the total number of characters in one utterance. The number of times of uttering refers to the number of utterances per day. The utterance time refers to a time taken to talk to one work counterpart P2. The utterance speed refers to the number of characters per unit time. Each of the utterance quantity, the number of times of uttering, the utterance time, and the utterance speed is an example of the motion type.

Plural types of motion information which are detected or analyzed for the worker P1 are input to the first probability distribution calculation unit 53A with the elapse of time. The first probability distribution calculation unit 53A calculates a probability distribution for each motion type, based on pieces of motion information in a predetermined time (for example, one day). The motion information indicates a value for each motion type, which is output from the first smiling-face detection unit 51A and the first utterance analysis unit 52A. The motion information input to the second probability distribution calculation unit 53B is also similar. The probability distribution calculated by the first probability distribution calculation unit 53A is an example of a first evaluation value obtained by evaluating the motion of the worker P1 in time series. The probability distribution calculated for the worker P1 is used for evaluating the development degree of the worker P1. Thus, at least two probability distributions obtained in time series are required. This is similarly applied to a probability distribution calculated for the work counterpart P2 by the second probability distribution calculation unit 53B.

Plural types of motion information for the work counterpart P2 are input to the second probability distribution calculation unit 53B with the elapse of time. Similar to the first probability distribution calculation unit 53A, the second probability distribution calculation unit 53B calculates a probability distribution for each motion type, based on pieces of motion information in a predetermined time (for example, one day). The probability distribution calculated by the second probability distribution calculation unit 53B is an example of a second evaluation value obtained by evaluating the motion of the work counterpart P2 in time series.

The first motion level calculation unit 54A evaluates the motion level of the worker P1 by using a distance between the probability distribution for the worker, which is calculated by the first probability distribution calculation unit 53A in the predetermined period (for example, one day), and a probability distribution for an expert group, which is stored in the first expert probability distribution storage unit 55A.

The second motion level calculation unit 54B evaluates the motion level of the work counterpart P2 by using a distance between the probability distribution for the work counterpart, which is calculated by the second probability distribution calculation unit 53B in the predetermined period (for example, one day), a probability distribution for an expert group, which is stored in the second expert probability distribution storage unit 55B. "The probability distribution of the expert group" is obtained by averaging probability distributions for plural experts.

The probability distribution for the expert group corresponding to the worker P1 is stored in the first expert probability distribution storage unit 55A for each motion type. The probability distribution for the expert group corresponding to the work counterpart P2 is stored in the second expert probability distribution storage unit 55B for each motion type. The probability distribution of the expert group is an example of a reference evaluation value.

The first development stage determination unit 56A determines a development stage of the worker P1 among "a beginner period", "a development period", and "an expert period" (which are respectively referred to as a "low" development degree, a "middle" development degree, and a "high development degree"), based on the motion level of the worker P1, which has been calculated by the first motion level calculation unit 54A. The number of development stages is not limited to 3 and may be 2, or 4 or greater. "The development period" means a period in which the gradient of the moving average of the motion level is continuously positive, or a period in which the motion level continuously exceeds a preset threshold. "The beginner period" means a period (development stage) before "the development period". "The expert period" means a period (development stage) after "the development period". In a case where it is not possible to specify that the worker P1 is in "the development period", the development stage of the worker may be set to belong to "the beginner period". The development stage determined for the worker P1 by the first development stage determination unit 56A is an example of a first development degree.

The second development stage determination unit 56B determines a development stage of the work counterpart P2 among "a mutual unfamiliar period", "a familiarizing process", and "a familiar period" (which are respectively referred to as the "low" development degree, the "middle" development degree, and the "high development degree"), based on the motion level of the work counterpart P2, which has been calculated by the second motion level calculation unit 54B. The number of development stages is not limited to 3 and may be 2, or 4 or greater. "The familiarizing process" means a period in which the gradient of the moving average of the motion level is continuously positive, or a period in which the motion level continuously exceeds a preset threshold. "The mutual unfamiliar period" means a period (development stage) before "the familiarizing process". "The familiar period" means a period (development stage) after "the familiarizing process". The development stage determined for the work counterpart P2 by the second development stage determination unit 56B is an example of a second development degree.

An evaluation model and a weighting coefficient table 580 (see FIG. 3) which correspond to a combination of the development degrees of the worker P1 and the work counterpart P2 are stored in the motion-evaluation model storage unit 58. A weighting coefficient which is used in the evaluation model and corresponds to the development degrees (development stage) of the worker P1 and the work counterpart P2 for each motion type is recorded in the weighting coefficient table 580.

The motion-evaluation model selection unit 57 selects a motion evaluation model used in accordance with the development degrees of the worker P1 and the development degree of the work counterpart P2, among motion evaluation models stored in the motion-evaluation model storage unit 58. The motion-evaluation model selection unit selects a weighting coefficient from the weighting coefficient table 580.

The motion evaluation unit 59 calculates a motion evaluation value of each motion type by using the motion evaluation model which is selected by the development degree of the worker P1 and the development degree of the work counterpart P2, based on the current motion level of the worker P1 and the current motion level of the work counterpart P2 for each motion type.

In a case where the motion level of the worker P1 for Motion type 1 is set as $x_1$ and the motion level of the work counterpart P2 for Motion type 1 is set as $x_2$, the motion evaluation value $y_1$ may be represented by Expression (1), for example. The motion evaluation value $y_1$ is an example of a third evaluation value.

$$y_1 = K_1 \cdot x_1 + K_2 \cdot x_2 \qquad (1)$$

Here, $K_1$ indicates a weighting coefficient corresponds to the development degree of the worker P1 and the development degree of the work counterpart P2. As illustrated in FIG. 3, $\alpha_{11}$, $\alpha_{12}$, $\alpha_{13}$, $\alpha_{21}$, $\alpha_{22}$, $\alpha_{23}$, $\alpha_{31}$, $\alpha_{32}$, and $\alpha_{33}$ are defined. $K_2$ may, for example, be set to 1 or be a weighting coefficient corresponding to the development degree of the work counterpart P2. Similar to $K_1$, $K_2$ may be a weighting coefficient corresponding to the development degree of the worker P1 and the development degree of the work counterpart P2. $K_1$ may be set to 1 or may be a weighting coefficient corresponding to the development degree of the worker P1.

The motion evaluation unit 59 integrates the motion evaluation value calculated for each motion type and evaluates the work skill of the worker. When motion evaluation values of motion types 1, 2, . . . , and N are respectively set to be $y_1$, $y_2$, and $y_n$, the work skill z may be represented by Expression (2), for example. The work skill z is an example of a fourth evaluation value.

$$z = a_1 \cdot y_1 + a_2 \cdot y_2 + \ldots + a_n \cdot y_n \qquad (2)$$

Here, $a_1$, $a_2$, . . . , and $a_n$ indicate weighting coefficients.

FIG. 3 is a diagram illustrating an example of the weighting coefficient table 580 stored in the motion-evaluation model storage unit 58. The weighting coefficient table 580 selects a weighting coefficient for the motion level of the worker P1 in a case where the motion-evaluation model selection unit 57 selects the motion evaluation model from the motion-evaluation model storage unit 58. Regarding the weighting coefficient, a value defined corresponding to the development degree of the worker P1 and the development degree of the work counterpart P2 is recorded for each motion type. For example, Motion type 1 may indicate the number of times of smiling, Motion type 2 may indicate the utterance quantity, and Motion type 3 may indicate the number of times of uttering. FIG. 3 illustrates a case where $\alpha_{11}$, $\alpha_{12}$, $\alpha_{13}$, $\alpha_{21}$, $\alpha_{22}$, $\alpha_{23}$, $\alpha_{31}$, $\alpha_{32}$ and $\alpha_{33}$ are recorded for Motion type 1, $\beta_{11}$, $\beta_{12}$, $\beta_{13}$, $\beta_{21}$, $\beta_{22}$, $\beta_{23}$, $\beta_{31}$, $\beta_{32}$, and $\beta_{33}$ are recorded for Motion type 2, and $\gamma_{11}$, $\gamma_{12}$, $\gamma_{13}$, $\gamma_{21}$, $\gamma_{22}$, $\gamma_{23}$, $\beta_{31}$, $\gamma_{32}$, and $\gamma_{33}$ are recorded for Motion type 3.

Operation of First Exemplary Embodiment

Next, an example of an operation of the evaluation system 1 will be described with reference to FIGS. 4 to 6.

Figure 4:
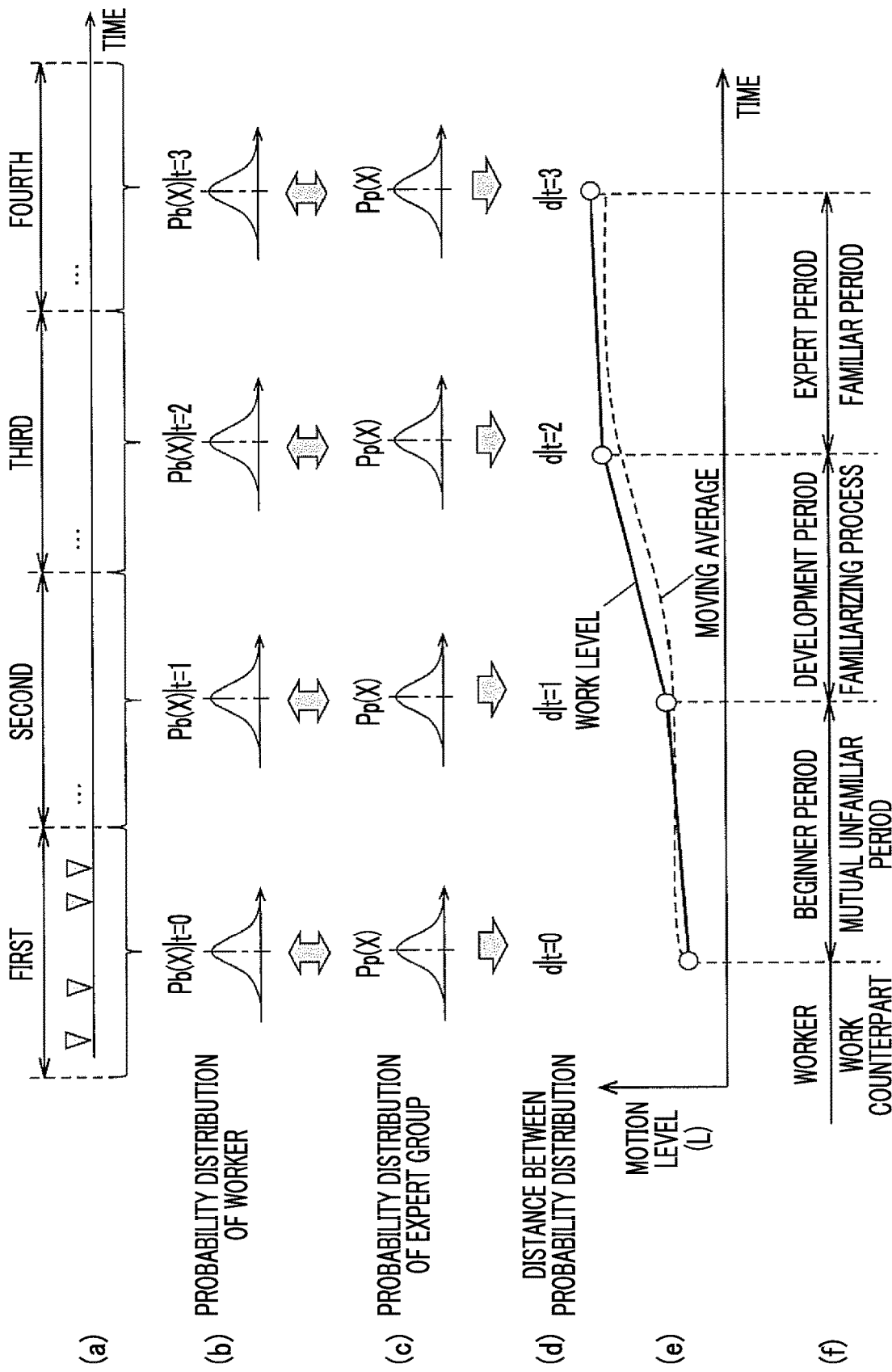
FIG. 4 is a diagram illustrating an example of a flow until a motion level and a development degree are calculated in one motion type.

FIG. 4 is a diagram illustrating an example of a flow until the motion level and the development degree are calculated in one motion type. In FIG. 4, (a) illustrates a time when the worker P1 works, (b) illustrates the probability distribution Pb (X)| of the worker P1, (c) illustrates the probability distribution Pp (X) of the expert group corresponding to the worker P1, and (d) illustrates a distance d|t between the probability distributions illustrated in (b) and (c). In addition, in FIG. 4, (e) illustrates the motion level L represented by a value (1/d|t) which is obtained by converting the distance d|t between the probability distributions into an increasing function, and (f) illustrates development periods of the worker P1 and the work counterpart P2. The moving average in the (f) of FIG. 4 is obtained while, for pieces of data obtained in time series, an average value of the data in a predetermined section is shifted by a section. A smooth curve may be acquired by removing noise.

Figure 5:
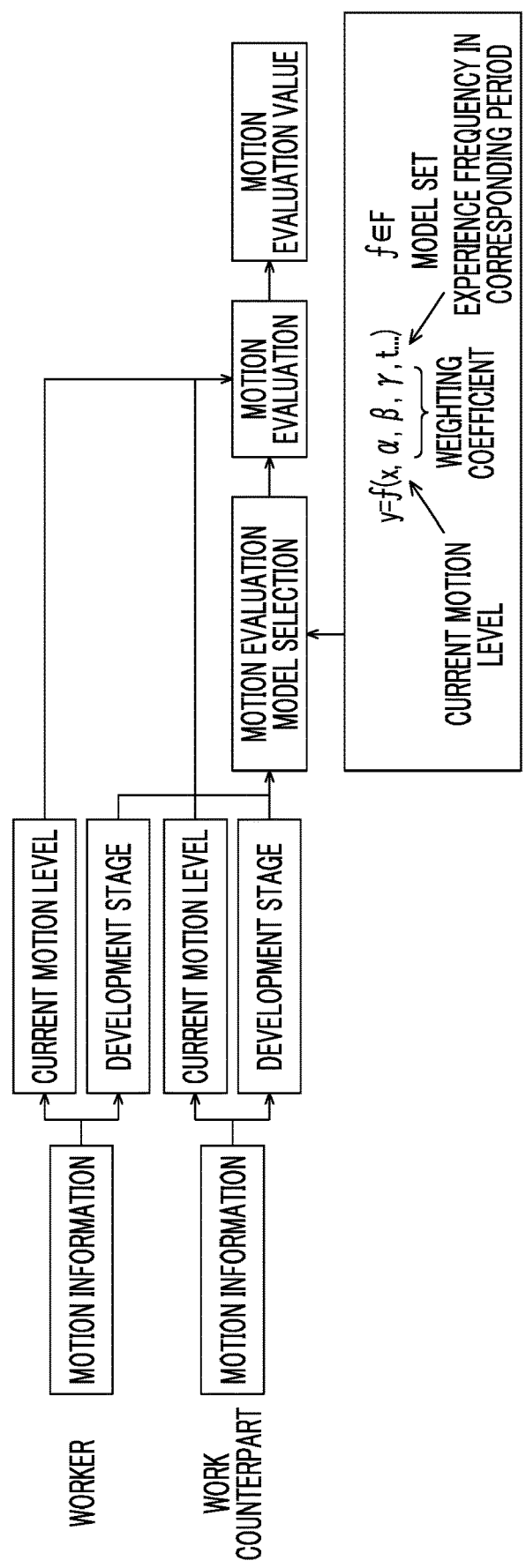
FIG. 5 is a schematic diagram illustrating an example of a flow from calculation of the motion level to calculation of a motion evaluation value, in one motion type.
Figure 6:
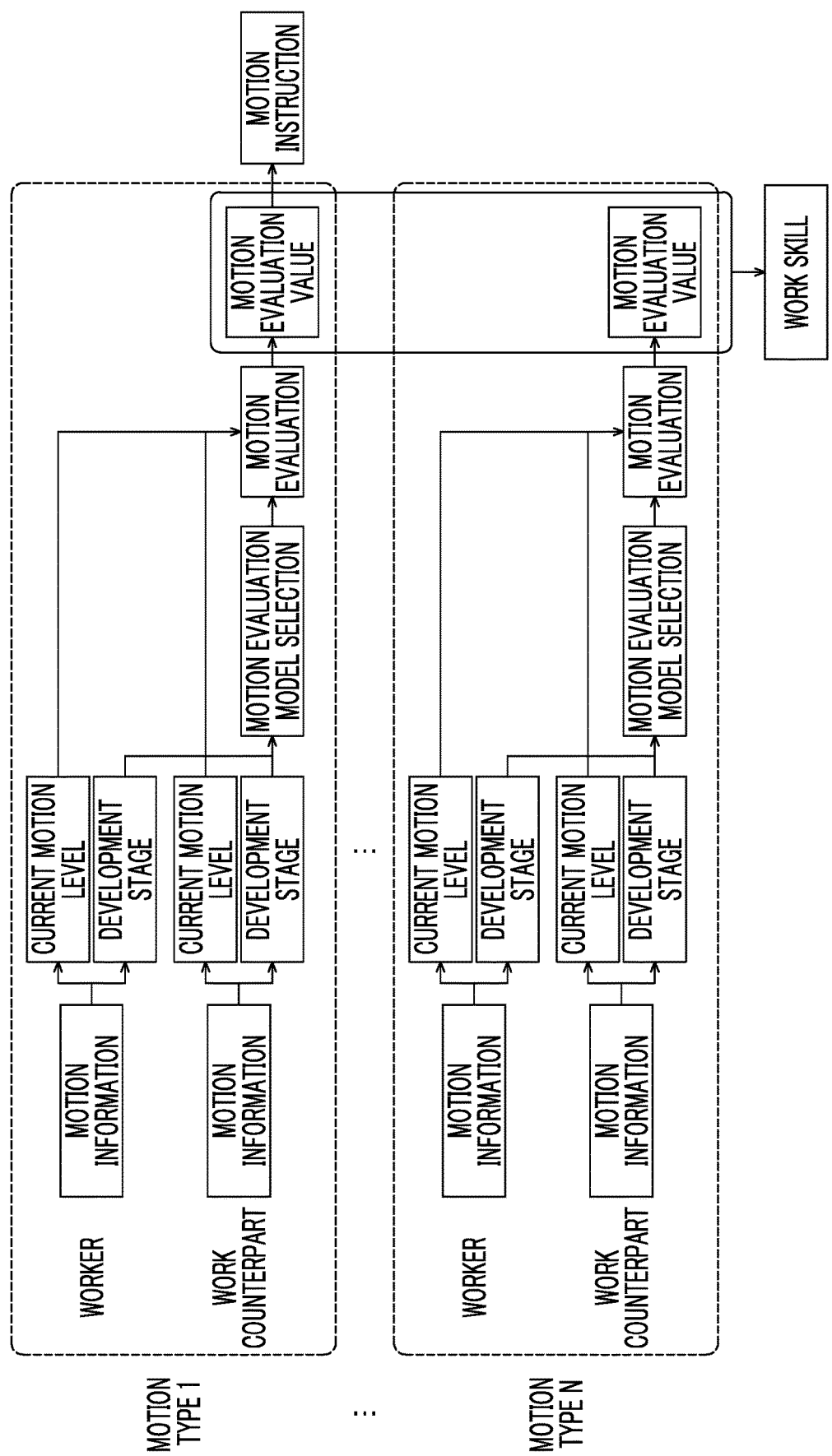
FIG. 6 is a schematic diagram illustrating an example of a flow until a work skill is evaluated based on the motion evaluation value obtained for each motion type.

FIG. 5 is a schematic diagram illustrating an example of a flow from calculation of the motion level to calculation of a motion evaluation value, in one motion type. FIG. 5 is a schematic diagram illustrating an example of a flow until the work skill is evaluated based on the motion evaluation value obtained for each motion type.

Evaluation Case 1 of Hospitality Skill of Clerk in Hospitality Industry

Next, a case of evaluating a hospitality skill of a clerk in a hospitality industry based on the utterance quantity will be described.

(1) Calculation of Motion Level of Clerk and Determination of Development Stage

As illustrated in FIGS. 4 and 5, motion information of utterance of a clerk P1 is input to the first probability distribution calculation unit 53A with the elapse of time. As illustrated in the (b) of FIG. 4, the first probability distribution calculation unit 53A calculates a probability distribution Pb (X)| of the utterance quantity of the worker P1 in a unit of one day.

As illustrated in the (c) of FIG. 4, a probability distribution Pp (X) of the utterance quantity in one day is stored for an expert group corresponding to the clerk P1, in the first expert probability distribution storage unit 55A.

Then, as illustrated in the (d) of FIG. 4, the first motion level calculation unit 54A calculates a distance d|t between the probability distribution Pb (X)| of the utterance quantity of the clerk P1 and the probability distribution Pp (X) of the utterance quantity of the expert group corresponding to the clerk P1. The first motion level calculation unit calculates a motion level L, as illustrated in the (e) of FIG. 4.

In a case where comparing motion information of the clerk to that of an expert for each time, an evaluation result changes each time and there is a probability that it is not possible to evaluate the original skill in a case where it happens to be successful. Thus, comparing is performed on probability distributions of plural pieces of motion information in a predetermined period.

As illustrated in the (f) of FIG. 4, the first development stage determination unit 56A determines a development stage of the clerk P1 among "the beginner period", "the development period", and "the expert period", based on the motion level of utterance, which has been calculated by the first motion level calculation unit 54A. Then, the first development stage determination unit estimates the development degree (development stage) of the clerk P1.

(2) Calculation of Motion Level of Customer and Determination of Development Stage Regarding a customer P2 as the work counterpart, similar to the clerk P1, motion information of utterance of the customer P2 is input to the second probability distribution calculation unit 53B with the elapse of time. As illustrated in the (b) of FIG. 4, the second probability distribution calculation unit 53B calculates a probability distribution Pb (X)| of the utterance quantity of the customer P2 in a unit of one day.

As illustrated in the (c) of FIG. 4, a probability distribution of the utterance quantity in one day is stored for an expert group corresponding to the customer P2, in the second expert probability distribution storage unit 55B.

Then, as illustrated in the (d) of FIG. 4, the second motion level calculation unit 54B calculates a distance between the probability distribution of the utterance quantity of the customer P2 and a probability distribution of the utterance quantity of an expert group corresponding to the customer P2, and calculates a motion level L.

As illustrated in the (f) of FIG. 4, the second development stage determination unit 56B determines a development stage of the customer P2 among "the mutual unfamiliar period", "the familiarizing process", and "the familiar period", based on the motion level L of the utterance quantity, which has been calculated by the second motion level calculation unit 54B. Then, the second development stage determination unit estimates the development degree (development stage) of the customer P2.

(3) Evaluation of Work Skill

The motion-evaluation model selection unit 57 acquires a motion evaluation model and a weighting coefficient which correspond to the development stage of the clerk P1(, which has been determined by the first development stage determination unit 56A) and the development stage of the customer P2(, which has been determined by the second development stage determination unit 56B) from the motion-evaluation model storage unit 58.

The motion evaluation unit 59 evaluates a hospitality skill of the clerk P1 based on pieces of motion information obtained with the elapse of time, by using the motion evaluation model and the weighting coefficient selected by the motion-evaluation model selection unit 57.

The motion evaluation model used for evaluating the motion information is changed in accordance with the development degrees of the clerk P1 and the customer P2. Although an input value of the motion evaluation model varies depending on the motion evaluation model, the current motion level is set to be common.

For example, it is preferable that the utterance quantities of the clerk P1 and the customer P2 are large. However, the utterance quantities thereof may not be large depending on the development degrees of the clerk P1 and the customer P2. For example, as illustrated in the (e) of FIG. 4, in a case where the clerk P1 is in "the expert period", but the customer P2 is in "the mutual unfamiliar period" (for example, the number of visits is low, or the customer does not like conversation), it is proper that the utterance quantity is small. In this case, the current motion level is low, but a scale of increasing the motion level is applied. That is, a small value is employed as a weighting coefficient β of the utterance quantity. Large weighting coefficients α and γ may be employed in other motion types.

In a case where the clerk P1 is in "the beginner period", but the customer P2 is in "the familiar period" because of being a regular customer, for example, it is preferable that the utterance quantity increases with an actively talk. That is, a large value is employed as the weighting coefficient β of the utterance quantity. Small weighting coefficients α and γ may be employed in other motion types.

As described above, one motion evaluation value is obtained for one motion type of a worker. Thus, in a case where pieces of motion information for plural motion types are acquired, plural motion evaluation values are obtained. Thus, as illustrated in FIG. 6, the work skill is evaluated with integrating the plural motion evaluation values by weighting addition.

For example, a method of setting the weighting coefficient used for each motion evaluation value, based on the experience of an evaluator or a method of obtaining the weighting coefficient used for each motion evaluation value, by machine learning with subjective work skill evaluation results of an evaluator as correct answers is provided. A motion of a worker, which is to be developed may be extracted by normalizing and comparing motion evaluation values for plural pieces of motion information. Regarding motion information having a relatively small motion evaluation value, an instruction or a suggestion for increasing the motion evaluation value may be performed.

Evaluation Case 2 of Hospitality Skill of Clerk in Hospitality Industry

Next, an evaluation case based on the utterance quantity and the number of times of smiling will be described as Evaluation Case 2 of the hospitality skill of a clerk in the hospitality industry.

When a clerk P1 performs hospitality, the utterance quantity and the number of times of smiling of the clerk P1 and the utterance quantity and the number of times of smiling of the customer P2 are acquired by using the camera 3 and the microphone 4. Regarding the utterance quantity and the number of times of smiling obtained each day, a probability distribution is created for each week and a distance between the created probability distribution and a probability distribution of an expert is calculated. A distance between a probability distribution of the utterance quantity and the number of times of smiling of the customer P2 and a probability distribution of a regular customer is calculated. A value obtained by converting the distance between the probability distributions into an increasing function is set as a motion level. That is, the motion level of the utterance quantity and the motion level of the number of times of smiling are acquired for each one week.

Regarding the motion levels of the utterance quantity and the number of times of smiling of the clerk P1 and the motion levels of the utterance quantity and the number of times of smiling of the customer P2 which are obtained for each one week, moving averages are obtained and periods to which the clerk P1 and the customer P2 respectively belong are estimated based on the gradients of the moving averages.

In a case where it is determined that the clerk P1 is in "the expert period" and it is determined that the customer P2 is in "the mutual unfamiliar period", a motion evaluation model and a weighting coefficient are selected based on the information. Examples of the input value of the motion evaluation model include the current motion levels of the clerk P1 and the customer P2, the number of experiences in the periods to which the clerk P1 and the customer P2 belong, an increase rate of the number of experiences, the previous motion evaluation value, stability (variation of motion level), and a development rate (gradient of motion level).

Regarding the clerk P1, the motion evaluation value for the utterance quantity and the motion evaluation value for the number of times of smiling are obtained and a hospitality skill is evaluated by weighting addition thereof. The weighting coefficients at this time may be subjectively determined by a store manager as the evaluator (for example, in a case where talking to the customer P2 is particularly needed in this store, the value of the weighting coefficient for the utterance quantity is increased). In addition, each weighting coefficient may be calculated by machine learning such as a neural net, using the value of a hospitality skill, which has been subjectively evaluated by the store manager as correct answers.

In a case where the motion evaluation value of the number of times of smiling is small when the motion evaluation value of the utterance quantity and the motion evaluation value of the number of times of smiling are normalized and compared, an increase of number of times of smiling is recommended. At this time, a motion to be developed may be extracted only by using the motion evaluation value of one worker. However, in a case where plural workers are present, the motion to be developed may be extracted based on motion evaluation values of the plural workers.

Second Exemplary Embodiment

Figure 7:
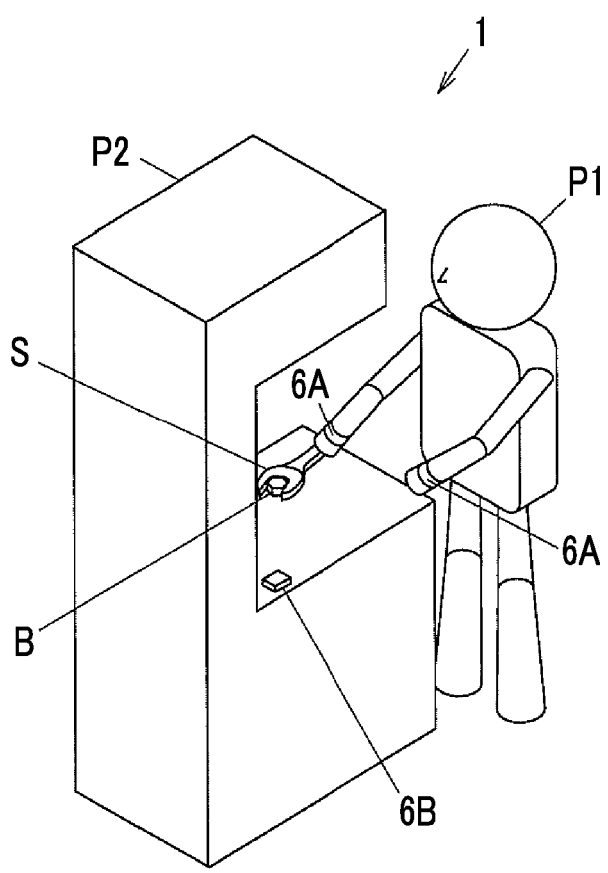
FIG. 7 is a diagram illustrating an example of a configuration of an evaluation system according to a second exemplary embodiment of the present invention.

FIG. 7 is a diagram illustrating an example of a configuration of an evaluation system according to a second exemplary embodiment of the present invention. The work counterpart P2 is a person in the first exemplary embodiment, but the work counterpart P2 is an object in the exemplary embodiment. Descriptions focusing on differences from the first exemplary embodiment will be made below.

An evaluation system 1 in the second exemplary embodiment includes, for example, a first sensor 6A and a second sensor 6B. The first sensor 6A is provided in a work area and is mounted on a worker P1 who works. The second sensor 6B is provided in the work area and is attached to a work counterpart P2 as a target of the work of the worker P1. The first sensor 6A and the second sensor 6B are also referred to as "a sensor 6" when being collectively referred to. The number of first sensors 6A and the number of second sensors 6B may be one or plural. The work counterpart P2 is set to be a device such as a processing machine, as an example of the object in the exemplary embodiment. The work counterpart P2 may be a tool in addition to the device.

The work area in the exemplary embodiment corresponds to a factory, a woodworking place, a pottery class, and a cooking class, for example. FIG. 7 illustrates a state where a bolt B provided in a processing machine as the work counterpart P2, which is installed in the work area of a factory is fastened to a wrench S by the worker P1.

Plural pieces of motion information are detected by the first sensor 6A. As the plural pieces of motion information, for example, acceleration, an angular velocity, the amount of change, the number of turns of the bolt B, fastening strength of the bolt B, and the like are provided. The first sensor 6A may be a wearable terminal integrated with a sensor that acquires motion information. The first sensor 6A may detect grip strength, torque, the number of rotations of the wrist, the line of sight, acceleration, angular acceleration, and the like. The motion information may be biological information of the heart rate, the respiration rate, concentration, and the like, in addition to information regarding the movement of an arm.

The second sensor 6B detects plural pieces of state information (corresponding to the motion information in the first exemplary embodiment). As the plural pieces of state information, for example, the number of times of use, the hours of use, the number of people using, durability, the number of times of dropping, a frequency, a noise level, and a motor rotation speed may be provided.

Figure 8:
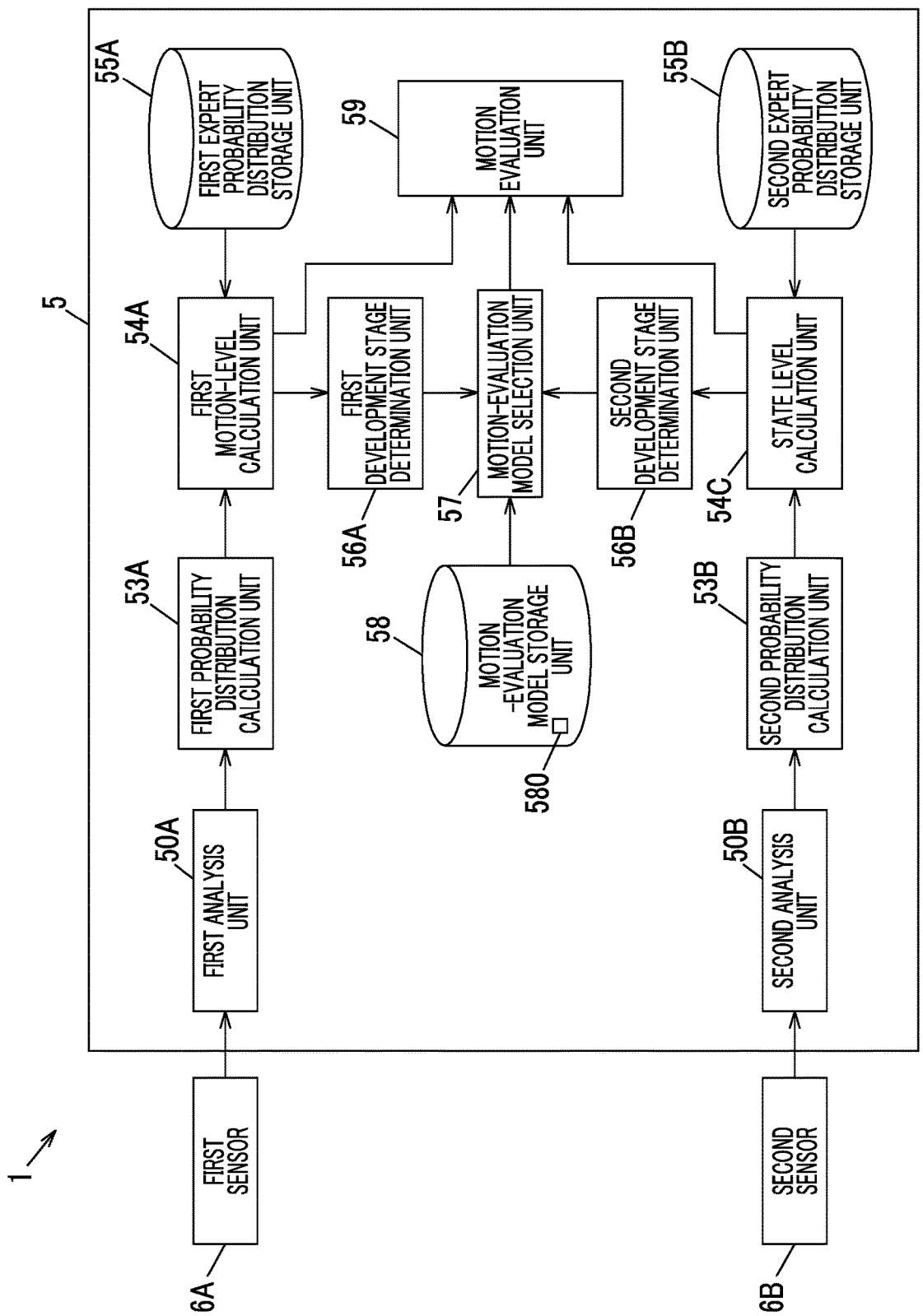
FIG. 8 is a block diagram illustrating an example of a control system in the evaluation system according to the second exemplary embodiment.

FIG. 8 is a block diagram illustrating an example of a control system of the evaluation system 1 in the second exemplary embodiment. The evaluation system 1 includes an evaluation device 5 connected to the first sensor 6A and the second sensor 6B (also referred to as "the sensor 6" when being collectively referred to).

A first analysis unit 50A is provided for the worker P1 in the evaluation device 5. Further, similar to the first exemplary embodiment, a first probability distribution calculation unit 53A, a first motion level calculation unit 54A, a first expert probability distribution storage unit 55A, and a first development stage determination unit 56A are provided in the evaluation device 5. The first sensor 6A is connected to the first analysis unit 50A. The first analysis unit 50A is an example of the acquisition section.

A second analysis unit 50B and a state level calculation unit 54C are provided for the work counterpart P2 in the evaluation device 5. Further, similar to the first exemplary embodiment, a second probability distribution calculation unit 53B, a second expert probability distribution storage unit 55B, and a second development stage determination unit 56B are provided in the evaluation device 5. The second sensor 6B is connected to the second analysis unit 50B. The second analysis unit 50B is an example of the acquisition section. The state level calculation unit 54C is an example of the calculation section that calculates the motion level of a work counterpart P2.

Similar to the first exemplary embodiment, a motion-evaluation model selection unit 57, a motion-evaluation model storage unit 58, and a motion evaluation unit 59 are provided in the evaluation device 5 so as to be common to the worker P1 and the work counterpart P2.

The first analysis unit 50A detects the movement of the arm of the worker P1 from the acceleration detected by the first sensor 6A, for example. The movement of the arm is an example of the motion type.

The second analysis unit 50B analyzes a frequency from the acceleration input from the second sensor 6B, for example. The frequency is an example of the motion type.

The state level calculation unit 54C evaluates a state level (for example, aging level) of the work counterpart P2 by using a distance between a probability distribution of a state (for example, frequency) of the work counterpart P2, which has been calculated by the second probability distribution calculation unit 53B in a predetermined period (for example, one day) and a probability distribution of a state (for example, frequency) of an expert group, which is stored in the second expert probability distribution storage unit 55B.

The second development stage determination unit 56B determines a development stage of the work counterpart P2 among "the mutual unfamiliar period", "the familiarizing process", and "the familiar period" (which are respectively referred to as the "low" development degree, the "middle" development degree, and the "high development degree"), based on the state level of the work counterpart P2, which has been calculated by the second motion level calculation unit 54B.

The motion evaluation unit 59 calculates a motion evaluation value of each motion type by using a motion evaluation model and a weighting coefficient which are selected by the development degree of the worker P1 and the development degree of the work counterpart P2, based on the current motion level of the worker P1 and the current state level of the work counterpart P2 for each motion type.

In the exemplary embodiment, for example, a probability distribution of the frequency is obtained and a distance between the obtained probability distribution and a probability distribution of the frequency of an old machine is evaluated as an aging level (corresponding to the motion level in a case where the work counterpart P2 is a person).

"The mutual unfamiliar period", "the familiarizing process", and "the familiar period" are specified based on the aging level of the work counterpart P2, which is obtained in time series. In this case, "the mutual unfamiliar period" indicates a state where the object is a new product. "The familiarizing process" indicates a state where the object is often used. "The familiar period" indicates a state where the object is old.

Sensing information of the worker P1 indicates, for example, an operation time required for one work, the size of a force applied for the one work, or the like. In an evaluation model in which the worker P1 is in "the expert period" and the object is in "the mutual unfamiliar period", a case of carefully working or a case of working with adjustment, since the object is a new product, is provided. Therefore, a weighting coefficient for a motion level for the operation time required for one work is set to be smaller than that in a general case (operation time required for one work is not needed).

In an evaluation model in which the worker P1 is in "the beginner period" and the object is in "the familiar period", in a case where the operation time required for one work is long, a burden increases and thus the object may break down. Therefore, a weighting coefficient for a motion level for the operation time required for one work is set to be large (favorable as becoming proficient).

Hitherto, the exemplary embodiments of the present invention are described. However, exemplary embodiments of the present invention are not limited to the above-described exemplary embodiments and various modifications and various methods may be made in a range without changing the gist of the present invention.

A portion or the entirety of each unit of the evaluation device 5 may be configured by a hardware circuit such as a field programmable gate array (FPGA) or an application specific integrated circuit (ASIC).

Some of the components in the exemplary embodiments may be omitted or be changed in the range without changing the gist of the present invention. In the flows in the exemplary embodiments, the step may be added, deleted, changed, replaced, or the like in the range without changing the gist of the present invention. A program used in the exemplary embodiments may be provided in a state of being recorded in a computer-readable recording medium such as a CD-ROM. The program used in the exemplary embodiments may be stored in an external server such as a cloud server and be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an acquisition processor that acquires at least two first evaluation values obtained by evaluating a motion of a first person in time series and a reference evaluation value obtained by evaluating a motion of a second person, different from the first person, as an exemplar of the first person, wherein the reference evaluation value acquired for the first person is not a time-series value;
   an output processor that outputs a development degree indicating a degree of development of the first person based on a difference between the at least two motion levels indicating similarity between the at least two first evaluation values and the reference evaluation value; and an evaluation processor that calculates a third evaluation value obtained by weighting addition of the at least two motion levels, wherein the evaluation value indicates a probability distribution in which a motion is performed, and the evaluation processor calculates the third evaluation value by using a calculation expression having a weight varying depending on a development degree of each of the at least two motion levels.

2. The information processing apparatus according to claim 1, wherein the motion level has a value corresponding to a distance between probability distributions.

3. The information processing apparatus according to claim 1, wherein the acquisition processor acquires the evaluation value for each motion type, and the output processor outputs the motion level for each motion type.

4. The information processing apparatus according to claim 3, wherein the evaluation processor calculates the third evaluation value for each motion type and calculates a fourth evaluation value obtained by weighting addition of the third evaluation value for each motion type.

5. The information processing apparatus according to claim 1, wherein the acquisition processor acquires the evaluation value for each motion type, and the output processor outputs the motion level for each motion type.

6. The information processing apparatus according to claim 1, wherein the reference evaluation value is a value obtained by evaluating motions of multiple persons.

7. An information processing apparatus comprising:

an acquisition processor that acquires at least two first evaluation values obtained by evaluating a motion of a first person in time series and a reference evaluation value obtained by evaluating a motion of a second person, different from the first person, as an exemplar of the first person, and acquires at least two second evaluation values obtained by evaluating a motion of a work counterpart as a counterpart of the first person in time series and a reference evaluation value obtained by evaluating a motion of a third person, different from the counterpart of the first person as an exemplar of the work counterpart, wherein the reference evaluation value acquired for the first person and the reference evaluation value acquired for the work counterpart are not time-series values; and an output processor that outputs a first development degree indicating a degree of development of the first person based on a difference between the at least two first motion levels indicating similarity between the at least two first evaluation values and the reference evaluation value which have been acquired for the first person, and outputs a second development degree indicating a degree of development of the work counterpart based on a difference between the at least two second motion levels indicating similarity between the at least two second evaluation values and the reference evaluation value which have been acquired for the work counterpart.

8. The information processing apparatus according to claim 7, wherein the evaluation value indicates a probability distribution in which a motion is performed.

9. The information processing apparatus according to claim 8, wherein the motion level has a value corresponding to a distance between probability distributions.

10. The information processing apparatus according to claim 9, further comprising:

an evaluation processor that calculates a third evaluation value obtained by weighting addition of the first motion level and the second motion level.

11. The information processing apparatus according to claim 10, wherein the evaluation processor calculates the third evaluation value by using a calculation expression having a weight varying depending on a development degree of each of the first motion level and the second motion level.

12. The information processing apparatus according to claim 8, further comprising:

an evaluation processor that calculates a third evaluation value obtained by weighting addition of the first motion level and the second motion level.

13. The information processing apparatus according to claim 12, wherein the evaluation processor calculates the third evaluation value by using a calculation expression having a weight varying depending on a development degree of each of the first motion level and the second motion level.

14. The information processing apparatus according to claim 7, further comprising:

an evaluation processor that calculates a third evaluation value obtained by weighting addition of the first motion level and the second motion level.

15. The information processing apparatus according to claim 14, wherein the evaluation processor calculates the third evaluation value by using a calculation expression having a weight varying depending on a development degree of each of the first motion level and the second motion level.

16. The information processing apparatus according to claim 7, wherein the motion of the work counterpart comprises a state of the work counterpart, the motion of the second person comprises the state of the second person, and the at least two second motion levels comprise two second state levels.

17. The information processing apparatus according to claim 7, wherein the reference evaluation value is a value obtained by evaluating motions of multiple persons.

* * * * *